United States Patent
Hoiness et al.

(10) Patent No.: US 7,463,980 B2
(45) Date of Patent: Dec. 9, 2008

(54) UTILITY DATA COLLECTION SYSTEM EMPLOYING LOCATION DATA RECEIVER, SUCH AS A DUAL USB PORT GPS RECEIVER

(75) Inventors: Steve Hoiness, Spokane, WA (US); Barry Cahill-O'Brien, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 917 days.

(21) Appl. No.: 10/957,317

(22) Filed: Oct. 1, 2004

(65) Prior Publication Data
US 2006/0074556 A1    Apr. 6, 2006

(51) Int. Cl.
*G01C 21/00* (2006.01)
(52) U.S. Cl. .................. 701/213; 701/200; 342/357.06; 715/733
(58) Field of Classification Search ......... 701/200–215, 701/36; 340/988, 989; 715/733; 342/357.01, 342/357.06, 357.12
See application file for complete search history.

(56) References Cited

U.S. PATENT DOCUMENTS

| 4,860,018 | A | 8/1989 | Counselman |
| 5,654,717 | A | 8/1997 | Nichols |
| 5,825,887 | A | 10/1998 | Lennen |
| 5,923,287 | A | 7/1999 | Lennen |
| 6,078,283 | A | 6/2000 | Bednar |
| 6,593,878 | B2 | 7/2003 | Fall |
| 6,674,400 | B1 | 1/2004 | Hynes |
| 6,971,063 | B1 * | 11/2005 | Rappaport et al. .......... 715/733 |

OTHER PUBLICATIONS

Meinberg GPS167, Satellite Receiver, Meinberg Funkuhren, Germany, May 10, 2004, 2 pages.

* cited by examiner

*Primary Examiner*—Richard M. Camby
(74) *Attorney, Agent, or Firm*—Perkins Coie LLP

(57) ABSTRACT

A method for enabling a single antenna and a single GPS or other receiver to transmit GPS data to multiple software applications is disclosed herein. A GPS satellite transmits GPS data to a GPS receiver through an antenna. The GPS data travels to a GPS splitter, where the GPS data is transmitted to a GPS utility data collection application and to another GPS application. The software applications can be on a single or on multiple computers. The GPS signals may also be split into multiple streams internal to a single computer.

17 Claims, 6 Drawing Sheets

UTILITY DATA COLLECTION SYSTEM EMPLOYING LOCATION DATA RECEIVER, SUCH AS A DUAL USB PORT GPS RECEIVER

TECHNICAL FIELD

The following disclosure relates generally to utility data collection.

BACKGROUND

Many utility data collection applications involving, e.g. a vehicle traversing a route to wirelessly and automatically gather utility data, require geographic position information. Current methods for transmitting GPS (global positioning system) data from a GPS receiver to multiple software applications require the use of multiple GPS receivers and antennas. Under current methods, a separate antenna and GPS receiver accompany each software application. This implementation can be cumbersome since multiple holes must be drilled in a vehicle to accommodate multiple antennas and multiple GPS receivers for multiple software applications. In addition, the implementation tends not to be cost effective since a separate antenna and GPS receiver must accompany each software application. If multiple software applications need GPS data, such as utility data collection and field servicing applications, then the cost can be quite high.

In an alternative embodiment, a single antenna and a single GPS receiver can supply GPS data to multiple applications. Under this implementation, the antenna and the GPS receiver can only supply GPS data to one software application at a time. If two software applications need GPS data, then one application needs to be shut down or halted while the other receives GPS data, and vice versa. This implementation can waste time since multiple software applications cannot simultaneously receive GPS data, but must wait for one software application to finish receiving GPS data before another software application can receive it.

DETAILED DESCRIPTION

The following disclosure describes a method for enabling a single antenna and a single GPS receiver to transmit GPS data to a single or multiple software applications. Embodiments of the invention allow two separate USB connections to utilize a single GPS data stream. A GPS satellite transmits GPS data to a GPS receiver through a single antenna mounted on a vehicle. The GPS receiver transmits the GPS data to a GPS splitter. The GPS splitter transmits the GPS data to a GPS utility data collection application and to one or more other GPS applications. The multiple software applications can be located on one or more computers. Although GPS systems are referred to in the above embodiment, the use of a splitter to allow two separate USB connections to utilize a single data stream is applicable to other location determining systems (e.g., LORAN-C, cellular base station-assisted systems, etc.) and is not limited to GPS systems.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Figure 1:
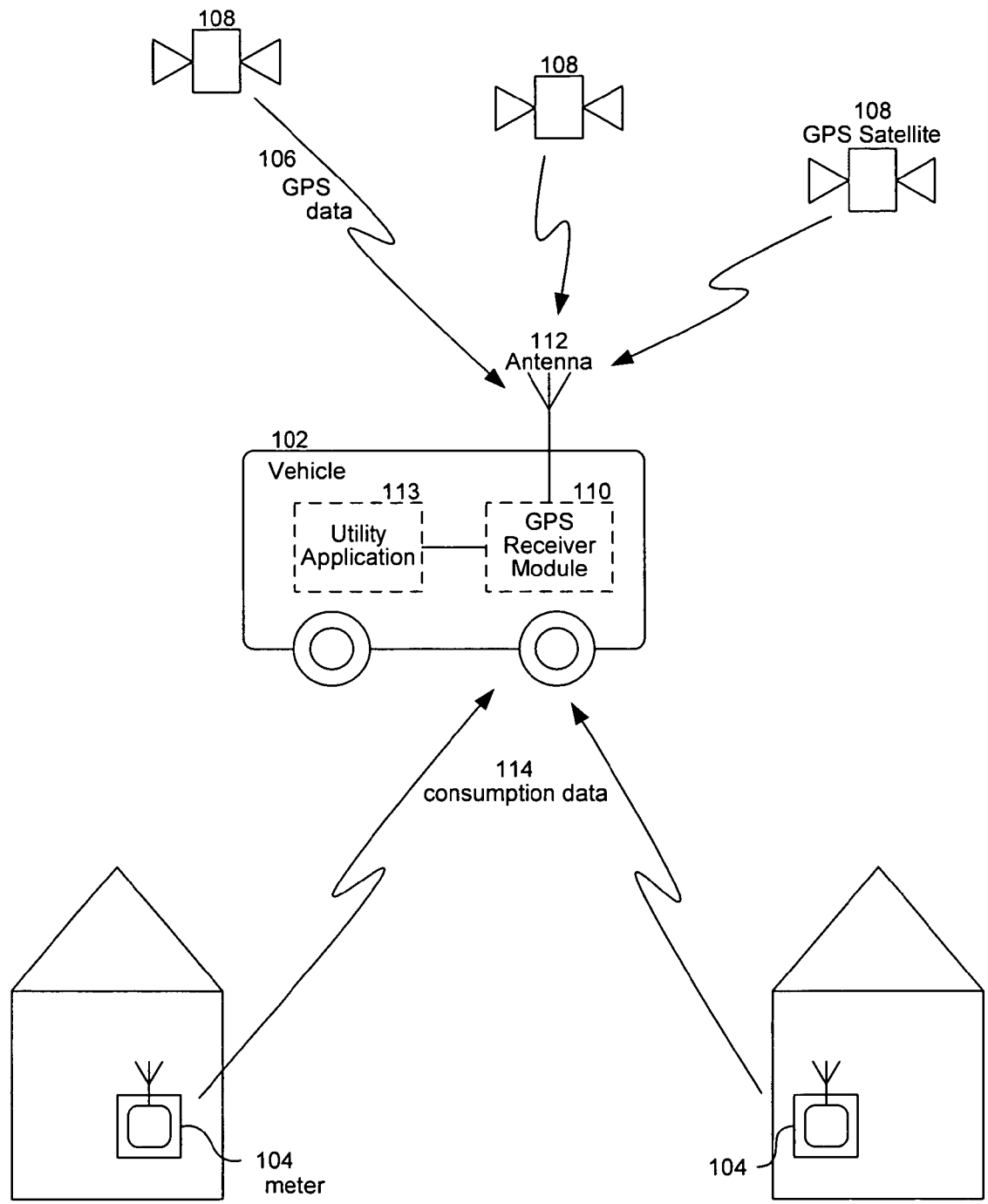
FIG. 1 is a schematic diagram illustrating a suitable environment in which a GPS receiver module can be implemented in accordance with embodiments of the invention.

FIG. 1 and the following discussion provide a brief, general description of a suitable environment in which aspects of the invention can be implemented. Thereafter, details on embodiments of the invention are provided. Although not required, aspects and embodiments of the invention will be described in the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

FIG. 1 illustrates a suitable environment in which a GPS (global positioning system) receiver module 110 can be implemented in accordance with several embodiments of the invention. A GPS satellite 108 transmits GPS data 106 to the GPS receiver module 110 through an antenna 112. The GPS receiver module 110 is located inside a vehicle 102 in this embodiment. The GPS receiver module 110 communicates with a utility application 113 that receives consumption data 114 from a meter 104.

Several methods exist to gather consumption data 114 from a meter 104, such as via a two-way transceiver that transmits the consumption data 114 to a vehicle 102. Alternatively, the meter 104 "bubbles up" the consumption data 114 to the vehicle 102. The above embodiments illustrate several ways in which the consumption data 114 can be transmitted to a vehicle 102 and are not meant to be all encompassing or definitive. Other elements could be included.

Figure 2:
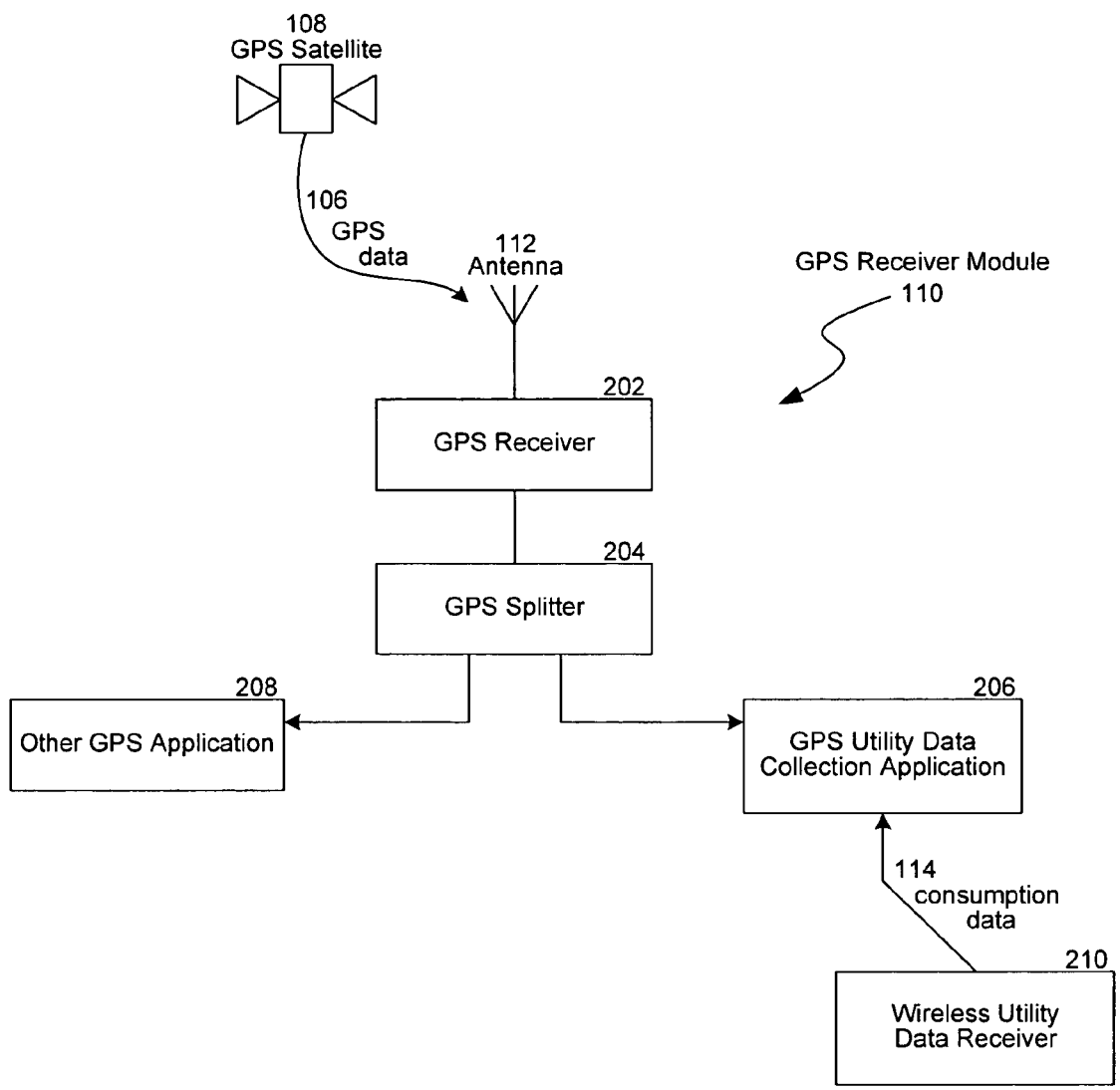
FIG. 2 is a block diagram illustrating functional components of a GPS receiver module configured in accordance with an embodiment of the invention.

FIG. 2 illustrates functional components of the GPS receiver module 110 configured in accordance with an embodiment of the invention. The GPS satellite 108 transmits GPS data 106 to a GPS receiver 202 through the antenna 112. The GPS receiver 202 transmits the GPS data 106 to a GPS splitter 204. The GPS splitter 204 sends the GPS data 106 to a GPS utility data collection application 206 and to another GPS application 208. The GPS receiver 202 converts the GPS signals into a digital data stream, which contains position and time data, relative to the position of the antenna 112. This digital data is passed to the splitter 204 which replicates it and sends it out on multiple ports (2 in this case). Each application listens for this data on a single port.

An example of the GPS utility data collection application 206 is MC2 meter reading application by Itron of Spokane, Wash. Examples of other GPS applications 208 that receive GPS data 106 include field dispatch applications, field investigator applications, mapping applications, fleet tracking applications, Microsoft® MapPoint, Streets and Trips, etc. The GPS utility data collection application 206 receives the consumption data 114 from a wireless utility data receiver 210. Although GPS systems are referred to in the above embodiment, the use of a splitter to allow two separate USB connections to utilize a single data stream is applicable to other location determining systems (e.g., LORAN-C, cellular base station-assisted systems, etc.) and is not limited to GPS systems.

The GPS data 106 from the single GPS receiver 202 can thus be shared by the GPS utility data collection application 206 and the other GPS application 208 on a single computer. In an alternative embodiment, the GPS data 106 can be shared by two applications running on two different computers. The above embodiments illustrate two ways in which the GPS data 106 can be shared between multiple applications on a single or multiple computers and are not meant to be all encompassing or definitive.

As mentioned above, multiple computers can share the GPS data 106 in one embodiment. Multiple computers sharing GPS data 106 may utilize a peer-to-peer relationship in which any of the computers sharing the GPS data 106 can contact and interface with the GPS receiver 202. In this embodiment, no computer is designated to be a master or a slave, allowing multiple computers to share GPS data without utilizing a master-to-slave relationship. The above embodiment illustrates one way in which a computer can contact and set up the GPS receiver 202 and is not meant to be all encompassing or definitive.

Aspects of the invention may be practiced in a variety of other computing environments. User computers may include one or more central processing units or other logic-processing circuitry, memory, input devices (e.g., keyboards and pointing devices), output devices (e.g., display devices and printers), and storage devices (e.g., magnetic, fixed and floppy disk drives, and optical disk drives). User computers may include other program modules such as an operating system, one or more application programs (e.g., word processing or spreadsheet applications), and the like. The user computers can include wireless computers, such as mobile phones, personal digital assistants (PDA's), palm-top computers, etc., which communicate with the Internet via a wireless link. The computers may be general-purpose devices that can be programmed to run various types of applications, or they may be single-purpose devices optimized or limited to a particular function or class of functions.

Figure 3:
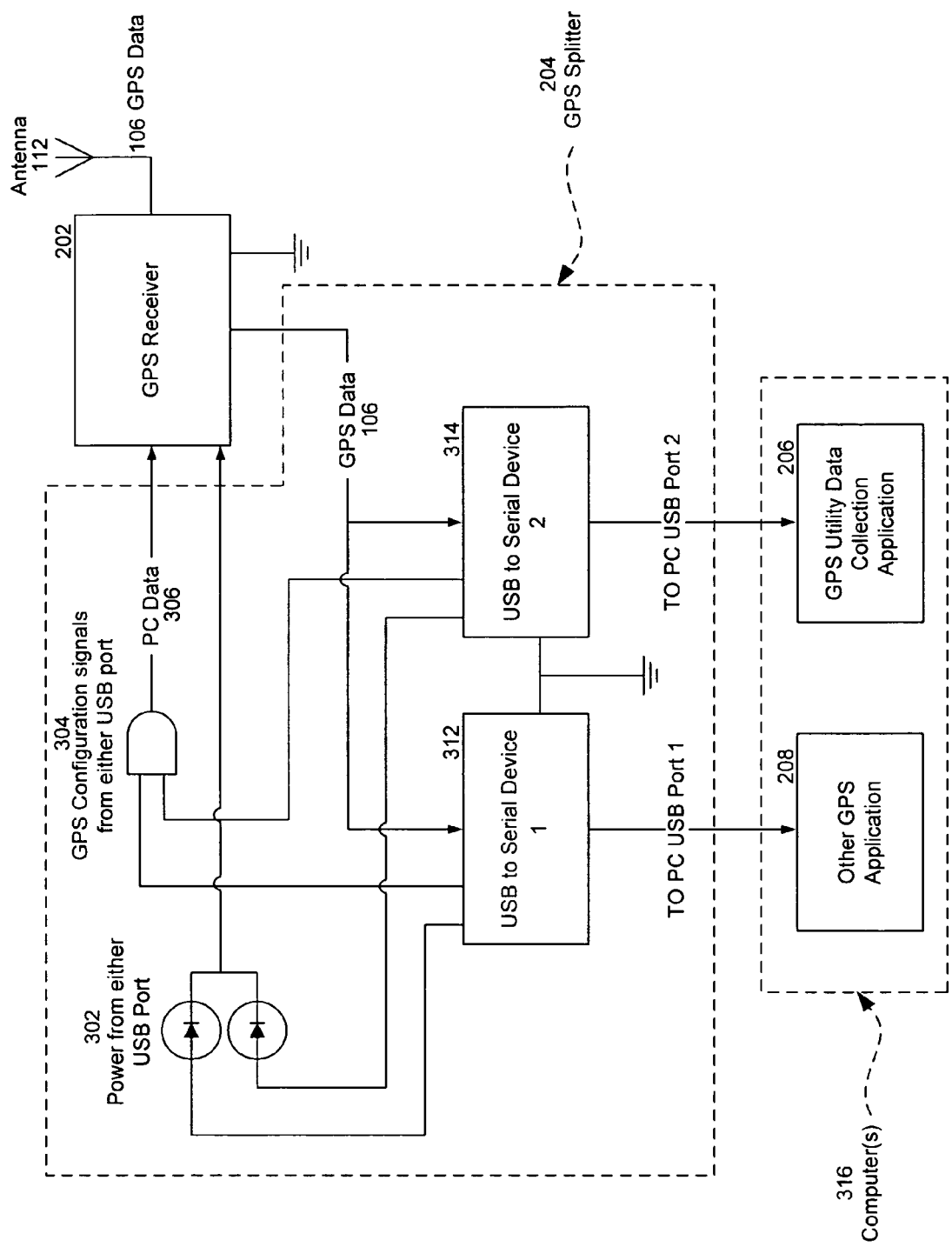
FIG. 3 is a schematic diagram illustrating functional components of a dual USB port GPS receiver.

FIG. 3 illustrates functional components of a dual USB (universal serial bus) port GPS receiver. Power from either USB port 302 is transmitted to the GPS receiver 202. GPS configuration signals from either USB port 304 transmit PC (personal computer) data 306 to the GPS receiver 202 (e.g., to change modes of the GPS receiver). The GPS receiver 202 transmits GPS data 106 to a USB to Serial device 1 (312) and a USB to Serial device 2 (314). (USB to serial devices may be obtained from, e.g., FTDI, Inc. of Glasgow, Scotland.) USB to serial devices permit a software application running on a computer, such as one which uses GPS to interface with a computer serial port (e.g., COM 3). USB to serial devices, using hardware external to the computer and software internal to the computer, can make GPS data available to the application just as if it was received on a serial port or virtual serial port. (Alternatively, applications employing the GPS data could also be written to use the data directly in USB format.)

In this embodiment, both USB to Serial devices 312 and 314 receive serial GPS data from the GPS receiver 202 and convert it to USB data, which may be passed to two separate USB ports on an external computer 316, such as a laptop PC. Both the USB to Serial devices 312 and 314 are part of the GPS splitter 204. The USB to Serial device 1 (312) transmits GPS data 106 to another GPS application 208, while the USB to Serial device 2 (314) transmits GPS data 106 to the GPS utility data collection application 206. The GPS splitter 204 may provide two USB ports that connect to two respective USB ports on the computer 316 via appropriate cabling.

Although FIG. 3 shows only two USB to serial devices, any number of USB to serial devices could be used in addition to the two devices shown. In one embodiment, the system can support three or more USB converters. Additional USB to serial device connections can be implemented to support the three or more USB converters. In this embodiment, the GPS splitter 204 channels the GPS data 106 to three or more USB converters which transmit the GPS data 106 to three or more applications.

More importantly, while a single computer 316 with two USB ports is generally described above, an alternative embodiment simply employs two computers running the separate applications, with each computer receiving the GPS data from its respective USB port. The above embodiments illustrate ways in which a GPS splitter 204 can transmit GPS data 106 to multiple USB converters and is not meant to be all encompassing or definitive. Other options could be presented or available at any of the above mentioned elements.

In an alternative embodiment, the GPS splitter 204 may employ only a single USB to Serial device, which is coupled to a single USB port on the computer 316. The computer 316 then makes the GPS data on the one USB port available to two or more applications on the computer with the use of intermediate code, as described below.

Figure 4:
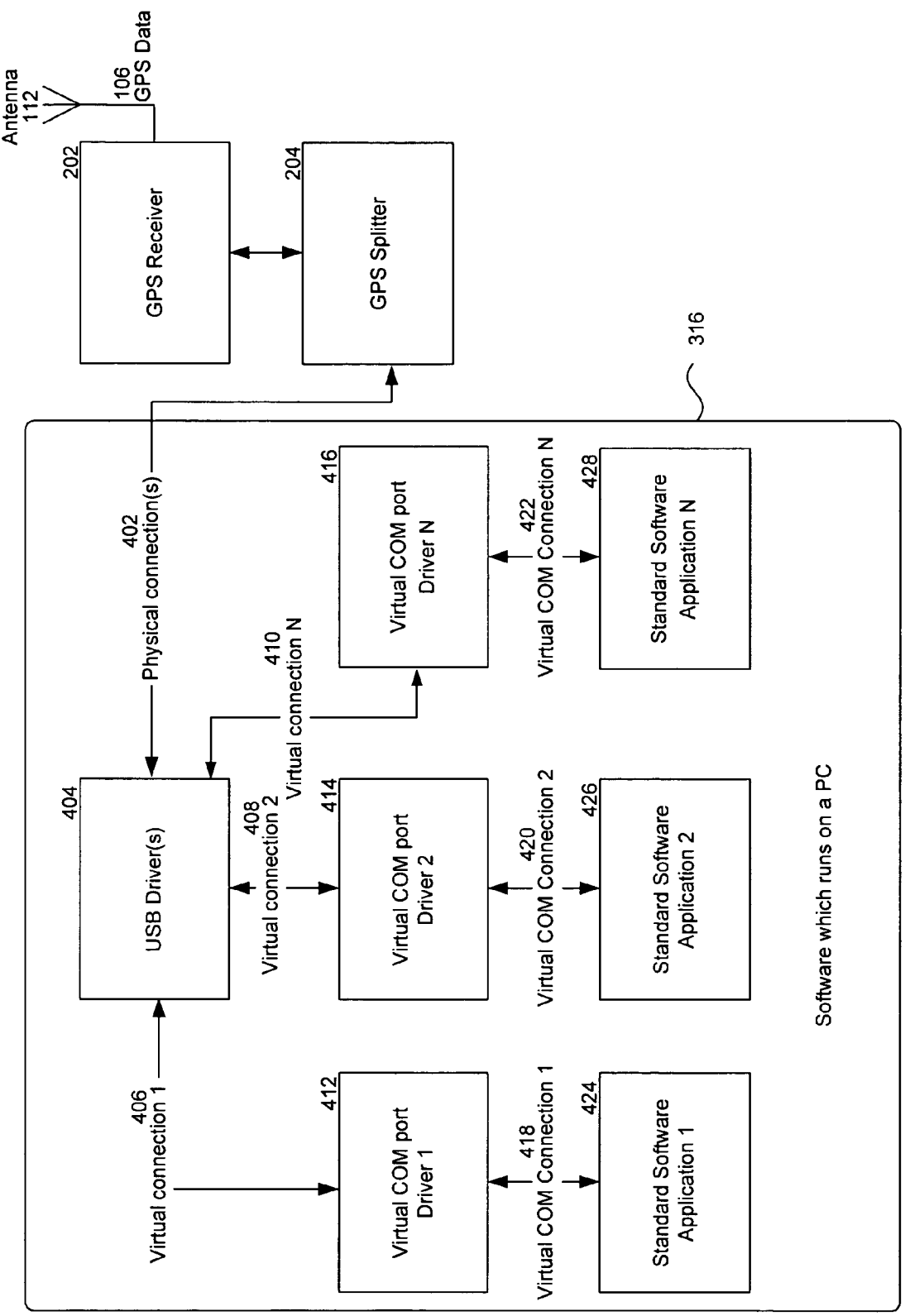
FIG. 4 is a block diagram illustrating a data flow from a GPS receiver to software applications in accordance with several embodiments of the invention.

FIG. 4 illustrates an example of data flow from a GPS receiver 202 to software applications where software on the computer generates two or more streams of GPS data from a original, single stream of input GPS data. As shown, the antenna 112 receives the GPS data 106 and provides it to the GPS receiver 202, which in turn provides it to the GPS splitter 204. A physical USB connection 402 links the GPS receiver 202/GPS splitter 204 to one or more USB drivers 404 which collect and send data or commands to the GPS receiver across a USB link. The USB driver 404 also divides or multiples the GPS data into multiple streams and supplies this data to each of multiple virtual COM port drivers. In particular, the USB driver 404 connects to virtual COM port driver 1 (412) through a virtual connection 1 (406), to virtual COM port driver 2 (414) through a virtual connection 2 (408), and to any other virtual COM port driver N (416) through a virtual connection N (410), where N is an integer greater than 2. While the GPS data arrives in a non-serial port format (USB), each virtual COM port driver makes the GPS data available as a virtual serial port.

Virtual COM port driver 1 (412) transmits GPS data 106 to a standard software application 1 (424) through a virtual COM connection 1 (418). In similar fashion, virtual COM port driver 2 (414) transmits GPS data 106 to a standard software application 2 (426) through a virtual COM connection 2 (420), and virtual COM port driver N (416) transmits GPS data 106 to a standard software application N (428) through a virtual COM connection N (422).

The virtual COM port driver maps a USB port to a virtual COM port so that the USB port is registered as a COM port for use by software applications running on a computer. As a result, the two USB output ports from the GPS splitter 204 connect to two USB ports on the computer 316, and then internal to the computer, the two USB ports are connected or effectively mapped to two (virtual) COM ports. A GPS utility data collection application can obtain GPS data 106 from one virtual COM port, while another GPS application 208 can obtain GPS data from another virtual COM port. The USB driver is a low level operating system driver, which makes the GPS data available to any number of other programs running on the computer 316. In particular, the virtual COM port drivers, which sit on top of the USB driver, convert the USB GPS data back to a serial format or otherwise make the data available for the various applications on the computer as if the data was coming from a serial port.

This is done because most "standard" applications do not communicate with GPS receivers under USB. In other words, the industry standard is serial format. However, serial ports only allow one application to communicate on the port at a time. The USB driver and virtual COM port drivers convert the USB GPS data to multiple virtual serial ports, so applications listening for GPS data can receive this data from the virtual port in a serial format ("virtual serial port"). Virtual ports are used to allow multiple applications to listen to the same GPS data. Normal operating systems (Windows®, etc) do not include a mechanism to allow serial data to be converted into virtual serial ports (often because it is already in serial format).

Figure 5:
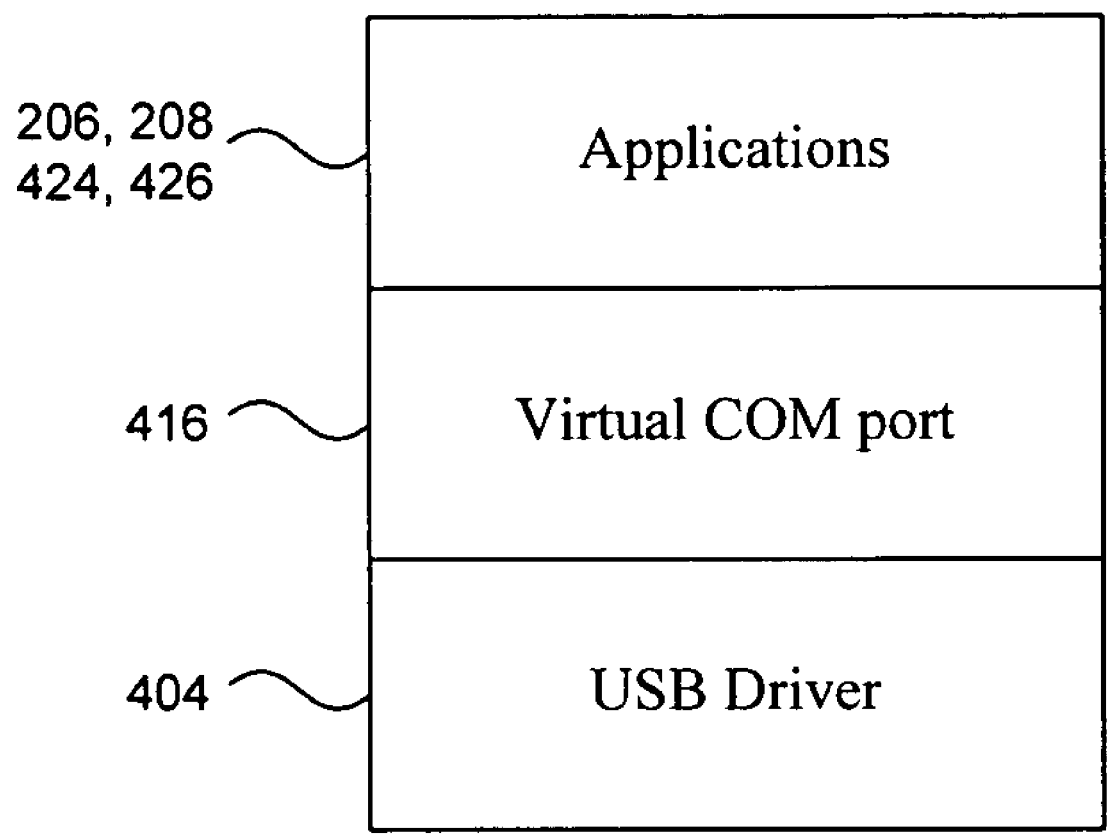
FIG. 5 is a block diagram illustrating software layers for implementing the embodiment of FIG. 4.

FIG. 5 shows how the different drivers are positioned relative to the applications. The USB driver 404 is the lower-level driver that receives the GPS data. It passes the GPS data up to the virtual COM drivers 412, 414. The virtual COM drivers in turn pass the (now COM port formatted) GPS data to respective applications.

Under the embodiment described above, two off-of-shelf USB drivers 404 are employed, where each receives one input GPS stream from one of two USB ports on the computer, and provides that data stream to one of the two virtual COM port drivers. Under an alternative embodiment, only a single GPS data stream is received at the computer, and a configured USB driver 404 splits the one stream into two or more for each of the virtual COM port drivers. Under this alternative embodiment, the GPS splitter 204 may be omitted if the GPS signals from the GPS receiver 202 may be input directly to the computer, such as with a GPS receiver having a USB output.

Figure 6:
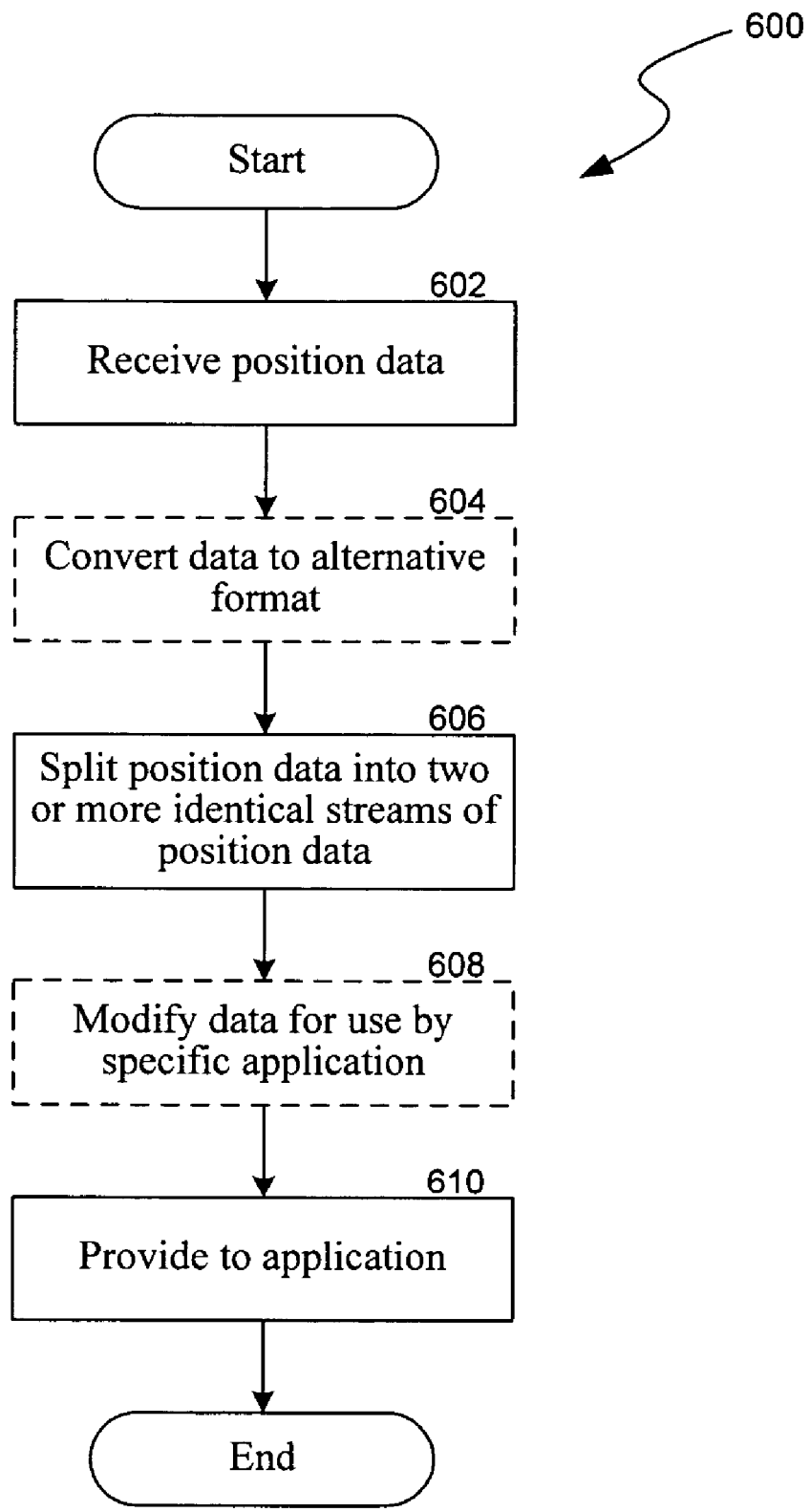
FIG. 6 is a flowchart illustrating the functionality performed by, e.g., the embodiment of FIG. 4.

FIG. 6 shows the functionality for the software embodiment of FIG. 4. A routine 600 begins by receiving position data (block 602). Optionally, the routine may convert the data to an alternate format, such as converting it from serial to USB (block 604). The routine then splits the position data into two or more identical streams of position data, such as by receiving two incoming USB signals and employing two USB drivers 404, or through the use of one incoming stream and a single USB driver 404 (block 606). For applications that accept the data in its current form, e.g., USB data, then the routine simply provides the data to the application (block 610). However, the data may need to be modified for the specific application, e.g., converted to serial COM port format via the virtual COM port driver (block 608).

The above embodiment employs USB, but alternative embodiments could employ other media. For example, under one alternative embodiment, GPS data 106 can be received by the software applications by any methods other than USB, such as via Ethernet, IEEE, 802.11, ultra-wideband, ultrasonic, infrared, and Bluetooth. In this alternative, the USB to serial converter and the USB driver could be replaced with another physical connection, such as Ethernet, wireless, etc.

Embodiments of the invention utilize a GPS splitter 204 to transmit the GPS data 106 to multiple applications. In an alternative embodiment, the GPS data 106 can be split within the software itself. A separate driver can be written to receive and to split the GPS data 106 from one USB port and to provide the data to two applications running on one or more computers. One GPS feed could be split into two GPS feeds within the driver so that two COM ports can be registered as one COM port.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

Words in the above Detailed Description using the singular or plural number may also include the plural or singular number respectively, where the context permits. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The teachings of the invention provided herein can be applied to other systems, not necessarily the system described herein. These and other changes can be made to the invention in light of the detailed description. The elements and acts of the various embodiments described above can be combined to provide further embodiments.

These and other changes can be made to the invention in light of the above detailed description. While the above description details certain embodiments of the invention and describes the best mode contemplated, no matter how detailed the above appears in text, the invention can be practiced in many ways. Details of configurations, functions, etc. may vary considerably in implementation details, while still being encompassed by the invention disclosed herein. As noted above, particular terminology used when describing certain features, or aspects of the invention should not be taken to imply that the terminology is being re-defined herein to be restricted to any specific characteristics, features, or aspects of the invention with which that terminology is associated. In general, the terms used should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

We claim:

1. In a system for gathering data reflecting consumption of a utility, wherein multiple utility meters and associated transmitters transmit utility consumption data to a vehicle, an apparatus for gathering the utility consumption data along a route, the apparatus comprising:

an antenna secured to the vehicle;

a global positioning system (GPS) receiver, coupled to the antenna, and configured to receive signals from the antenna and produce geographic position data;

a GPS splitter module coupled to receive the geographic position data from the GPS receiver and configured to produce at least two streams of universal serial bus (USB) formatted geographic position data; and a single computer secured to the vehicle and configured to receive the at least two streams of USB formatted geographic position data, wherein the single computer is neither a master nor a slave with respect to any other computer that may be coupled to the single computer and that may receive the geographic position data, and wherein the single computer substantially simultaneously runs at least a utility data collection application and at least one other application, wherein the utility data collection and the at least one other applications receive the at least two streams of USB formatted geographic position data, respectively, and wherein the single computer is further configured to convert at least one of the at least two streams of USB formatted geographic position data to a serial stream of geographic position data for use by at least one of the utility data collection application and the at least one other application.

2. The apparatus of claim 1 wherein the GPS splitter module includes a pair of USB to serial devices configured to receive a serial stream of formatted geographic position data from the GPS receiver and produce the at least two streams of USB formatted geographic position data, and wherein the single computer includes a USB driver configured to receive the at least two streams of USB formatted geographic position data, and includes two virtual COM port drivers configured to receive the at least two streams of USB formatted geographic position data from the USB driver and to produce at least two streams of serial geographic position data for the utility data collection and the at least one other applications.

3. In a system for gathering data reflecting consumption of a utility or for handling field service issues related to utility matters, an apparatus comprising:

a single geographic location determining system configured to produce geographic location data;

an intermediate system coupled to receive the geographic location data from the geographic location determining system and configured to produce at least one stream of data that is alternately formatted from the geographic location data; and at least first and second applications substantially simultaneously running on at least one computer, wherein the first application is at least one of a utility data collection application and a utility field service application, wherein the computer is configured to receive the at least one stream of alternately formatted geographic location data, wherein the computer is neither a master nor a slave with respect to any additional computer that may be coupled to the computer and that may receive the geographic location data therefrom, and wherein at least one of the intermediate system and the computer is configured to substantially simultaneously provide the geographic location data to each of the first and second applications, without the need for another geographic location determining system.

4. The apparatus of claim 3, further comprising a single antenna secured or removably secured to a vehicle, wherein the geographic location determining system is secured or removably secured to the vehicle and is configured to receive global positioning system (GPS) signals from the antenna.

5. The apparatus of claim 3 wherein the intermediate system is configured to produce at least one stream of universal serial bus (USB) geographic location data from serial GPS data from the computer from the geographic location determining system, and wherein the computer includes a virtual COM port driver to receive the stream of USB geographic location data and produce two streams of serial geographic position data for the first and second applications.

6. The apparatus of claim 3 wherein the intermediate system is configured to produce at least one stream of universal serial bus (USB) geographic location data for receipt by the computer.

7. The apparatus of claim 3 wherein the intermediate system is a global position system (GPS) splitter module coupled to receive GPS data from the geographic location determining system and configured to produce at least two streams of universal serial bus (USB) GPS data.

8. The apparatus of claim 3 wherein the computer is further configured to convert the at least one stream of alternatively formatted geographic location data to a serial stream of geographic location data for use by at least one of the first and second applications.

9. The apparatus of claim 3 wherein the intermediate system is a system external to the computer.

10. The apparatus of claim 3 wherein the intermediate system is a software system internal to the computer.

11. The apparatus of claim 3 wherein the intermediate system is configured to provide the geographic location data to the computer via an Ethernet connection.

12. The apparatus of claim 3 wherein the intermediate system is configured to provide the geographic location data to the computer via an IEEE 802.11, Bluetooth, ultra-wideband, infrared or ultrasound connection.

13. The apparatus of claim 3 wherein the first and second applications run on separate first and second computers, respectively.

14. The apparatus of claim 3 wherein the first and second applications run on a single computer, and wherein the single computer includes at least a USB driver or a virtual COM port driver to provide the geographic location data to the first and second applications.

15. The apparatus of claim 3 wherein the geographic location determining system is configured to produce the geographic location data based on LORAN or cellular phone base-station signals.

16. The apparatus of claim 1 wherein the antenna is removably secured to the vehicle.

17. The apparatus of claim 1 wherein the single computer is removably secured to the vehicle.

* * * * *